(12) United States Patent
Lee et al.

(10) Patent No.: US 8,496,150 B2
(45) Date of Patent: Jul. 30, 2013

(54) FLAT DISPLAY PANEL CUTTING APPARATUS

(75) Inventors: Jae-Pil Lee, Yongin (KR); Ki-Chul Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 445 days.

(21) Appl. No.: 12/458,554

(22) Filed: Jul. 15, 2009

(65) Prior Publication Data

US 2010/0011928 A1 Jan. 21, 2010

(30) Foreign Application Priority Data

Jul. 16, 2008 (KR) .................. 10-2008-0069171

(51) Int. Cl.
*B26D 7/18* (2006.01)
(52) U.S. Cl.
USPC .............................. 225/94; 225/96.5; 225/100
(58) Field of Classification Search
USPC .................. 225/94, 96.5, 1, 2, 100, 101, 103, 225/105
See application file for complete search history.

(56) References Cited

U.S. PATENT DOCUMENTS

| 3,520,457 | A | * | 7/1970 | Augustin et al. | 225/2 |
| 3,532,260 | A | * | 10/1970 | Augustin et al. | 225/2 |
| 5,064,408 | A | * | 11/1991 | Bridgeman | 493/194 |
| 5,069,195 | A | * | 12/1991 | Barozzi | 125/23.01 |
| 5,386,751 | A | * | 2/1995 | Dylla et al. | 83/18 |
| 5,927,582 | A | * | 7/1999 | Duecker | 225/2 |
| 6,913,177 | B2 | * | 7/2005 | Steiner | 225/2 |

FOREIGN PATENT DOCUMENTS

| KR | 10-2001-0078228 A | 8/2001 |
| KR | 10-2004-0054167 A | 6/2004 |

* cited by examiner

*Primary Examiner* — Ghassem Alie
(74) *Attorney, Agent, or Firm* — Robert E. Bushnell, Esq.

(57) ABSTRACT

An apparatus for cutting a flat display panel prevents a light emitting surface of a flat display panel from being damaged due to a pit or a scratch. The apparatus for cutting a flat display panel includes a stage supporting a rear substrate of the flat display panel, a chip blocking unit disposed to correspond to a non-scrap portion of the flat display panel, and a scrap breaker to grip a scrap portion of the flat display panel that is to be separated from the flat display panel. A scribing line is formed between the scrap portion and a non-scrap portion of the flat display panel.

14 Claims, 6 Drawing Sheets

FLAT DISPLAY PANEL CUTTING APPARATUS

CLAIM OF PRIORITY

This application makes reference to, incorporates the same herein, and claims all benefits accruing under 35 U.S.C. §119 from an application for FLAT DISPLAY PANEL CUTTING APPARATUS earlier filed in the Korean Intellectual Property Office on the 16th of Jul. 2008 and there duly assigned Serial No. 10-2008-0069171.

BACKGROUND OF THE INVENTION

1. Field of the Invention

The present invention relates to an apparatus for cutting a flat display panel and, more particularly, to an apparatus for cutting a flat display panel that is capable of removing a cause of a defective light emitting surface of the flat display panel.

2. Description of the Related Art

A flat display panel includes a liquid crystal display (LCD), a plasma display panel (PDP), and an organic light emitting diode (OLED) display. For convenience sake, the OLED display will be described as an example of the flat display panel.

The OLED display includes organic light emitting diodes including hole injection electrodes, an organic light emission layer, and electron injection electrodes, in which light is emitted by energy generated when excitons generated as electrons and holes are combined drop from an excited state to a ground state.

The OLED display includes subpixels disposed in a matrix form at a display area. Each subpixel includes an organic light emitting element and a driving circuit unit. The driving circuit unit includes a switching transistor, a driving transistor, and a storage capacitor.

The OLED display is formed by forming subpixels on a rear substrate and by sealing the rear substrate and a front substrate. A cutting apparatus is used to cut the rear substrate and the front substrate, namely, glass substrates, of the OLED display.

For example, the cutting apparatus performs scribing on the front substrate of the OLED display placed on a stage and breaks a scrap glass. While breaking is performed, a glass chip is generated, which falls on the front substrate constituting a light emitting surface to cause pits and scratches on the light emitting surface.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus for cutting a flat display panel having advantages of preventing a light emitting surface of the flat display panel from being defective due to a pit or a scratch.

An exemplary embodiment of the present invention provides an apparatus for cutting a flat display panel that includes a stage supporting a rear substrate of the flat display panel, a scrap breaker to grip a scrap portion of the flat display panel that is to be separated from the flat display panel, a chip blocking unit disposed over the flat display panel and disposed to correspond to a non-scrap portion of the flat display panel. A scribing line is formed between the scrap portion and the non-scrap portion of the flat display panel.

The apparatus for cutting a flat display panel may further include a connection member to connect the chip blocking unit to the scrap breaker, and a driving member for lifting or lowering the connection member.

The chip blocking unit may move by a first stroke distance from the connection member while an ascending and descending operations are being performed with respect to the connection member, the scrap breaker may move by a second stroke distance from the connection member while an ascending and descending operations are being performed with respect to the connection member, and the first stroke distance may be larger than the second stroke distance.

The chip blocking unit may include a first rod slidably coupled to the connection member, a first blocking member connected to the first rod and disposed to touch the non-scrap portion of the flat display panel while the scrap portion is being separated, a first elastic member coupled to the first rod to support a sliding motion of the first rod.

The chip blocking unit may further include a second blocking member formed at an upper end of the first blocking member and extending in an upward direction.

The scrap breaker may include a second rod slidably coupled to the connection member, a delivery member connected to the second rod, a pad coupled to the delivery member, and a second elastic member coupled to the second rod to support a sliding motion of the second rod. The pad grips the scrap portion while the scrap portion is being separated, and a gripping force is supplied to the pad from the delivery member.

The chip blocking unit and the scrap breaker may be in one of states that include a first state in which the first blocking member and the pad do not contact the flat display panel and a lower edge of the first blocking member is positioned lower than the pad, and a second state in which the first blocking member and the pad contact the flat display panel.

The flat display panel may be an organic light emitting diode (OLED) display. The scribing line may be formed on a front substrate of the flat display panel. The front substrate may include a light emitting surface. The scrap breaker may be disposed over the flat display panel.

Another embodiment of the present invention provides an apparatus for cutting a flat display panel that includes a stage supporting a rear substrate of an organic light emitting diode (OLED) display, a scrap breaker to grip a scrap portion of the OLED display that is to be separated from the OLED display, and a chip blocking unit disposed over the OLED display and disposed to correspond to a non-scrap portion of the OLED display. A scribing line is formed between the scrap portion and the non-scrap portion of the OLED display.

In the embodiment of the present invention, because the chip blocking unit is formed such that it corresponds to the scribing line formed on the light emitting surface of the flat display panel and the scrap portion is separated from the flat display panel by using the scrap breaker, the light emitting surface can be prevented from being defective due to a pit or a scratch in the cutting operation.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
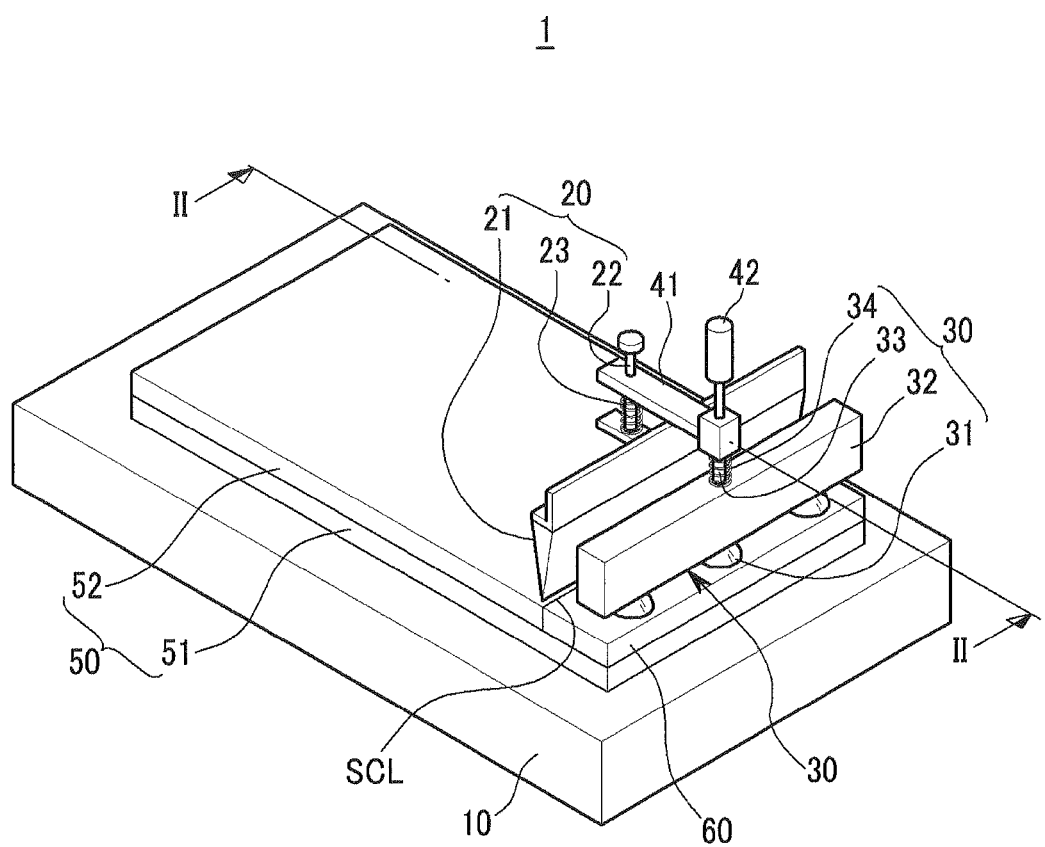
FIG. 1 is a perspective view of an apparatus for cutting a flat display panel according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
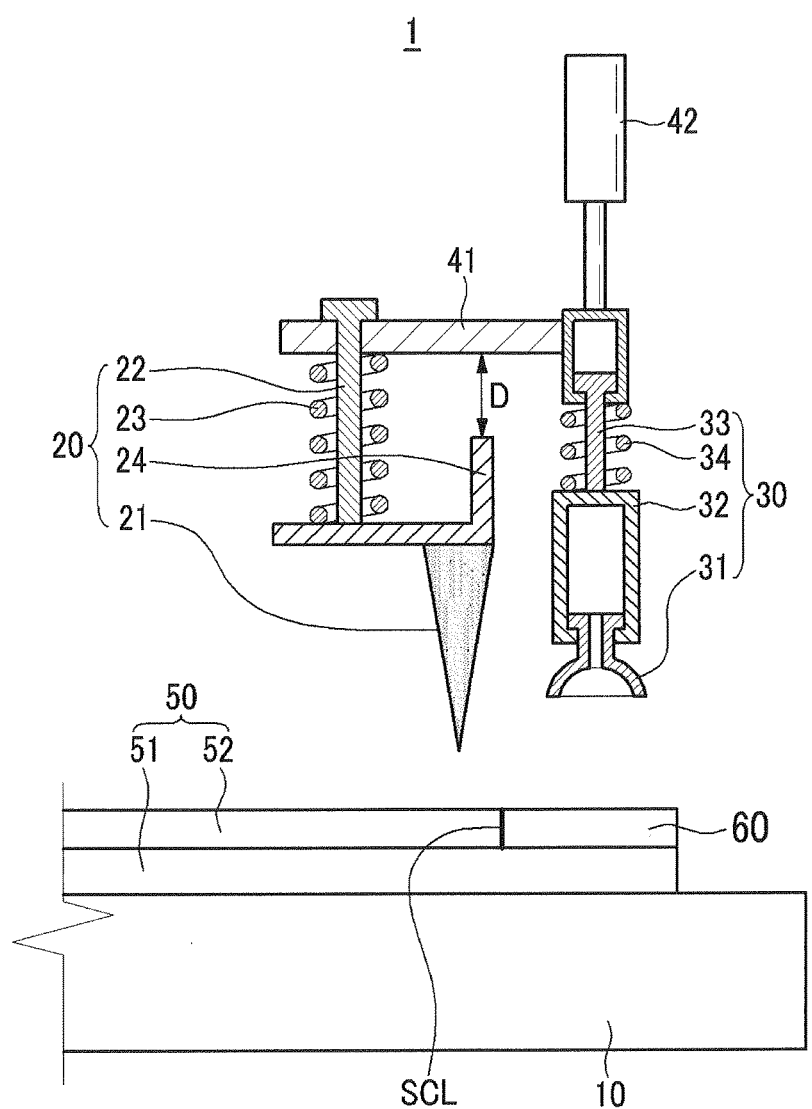
FIG. 2 is a cross-sectional view taken along line II-II in FIG. 1.

FIG. 1 is a perspective view of an apparatus for cutting a flat display panel according to an exemplary embodiment of the present invention, and FIG. 2 is a cross-sectional view taken along line II-II in FIG. 1.

With reference to FIGS. 1 and 2, a flat display panel cutting apparatus 1 according to an exemplary embodiment of the present invention includes a stage 10, a chip blocking unit 20, and a scrap breaker 30.

The stage 10 has an upper surface as a horizontal plane to support a flat display panel 50. The flat display panel 50 is formed by sealing a rear substrate 51 including a non-light emitting surface and a front substrate 52 including a light emitting surface. The flat display panel 50 includes a liquid crystal display (LCD), a plasma display panel (PDP), and an organic light emitting diode (OLED) display. For convenience sake, the OLED display will be taken as an example to be described in this exemplary embodiment of the present invention.

In the present exemplary embodiment, the flat display panel cutting apparatus 1 cuts an edge portion of at least one side of four sides of a front substrate 52, generating a scrap portion 60, in order to expose signal input/output units (not shown) of the flat display panel 50 such as the OLED display.

When the cutting process is completed by the flat display panel cutting apparatus 1 according to the present exemplary embodiment, the flat display panel 50 is in a state in which the signal input/output units (not shown) of subpixels are exposed from the rear substrate 51. Namely, the flat display panel 50 is in a state of a base substrate.

The state of the base substrate refers to a phase of a fabrication process in which an organic light emitting element L1 and a driving circuit unit are formed between the rear substrate 51 and the front substrate 52 and characteristics of each subpixel are inspected, before being completed into a module.

In a follow-up process of the cutting process performed by the flat display panel cutting apparatus 1 according to the exemplary embodiment of the present invention, inspection of the pixel characteristics of the flat display panel 50 in the state of the base station is performed.

Figure 3:
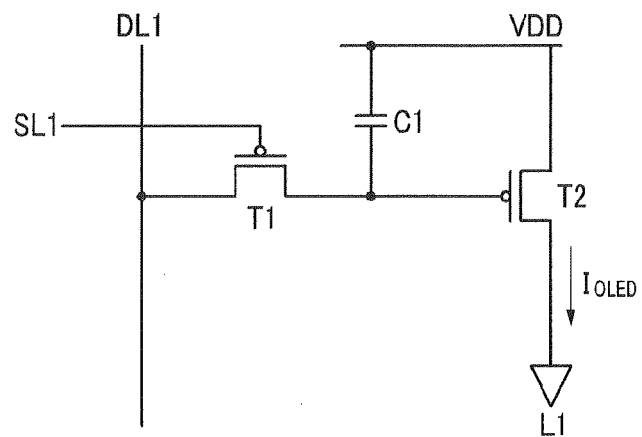
FIG. 3 is a schematic diagram illustrating the structure of a sub-pixel circuit of the flat display panel in FIG. 1.

First, the configuration of the OLED display, before the scrap portion 60 is cut, will be described. The OLED display includes subpixels in a matrix form on a display area of the mutually facing rear substrate 51 and front substrate 52. FIG. 3 is a schematic diagram illustrating the structure of a sub-pixel circuit of the flat display panel in FIG. 1, and FIG. 4 is a partially enlarged cross-sectional view of the flat display panel in FIG. 1.

Figure 4:
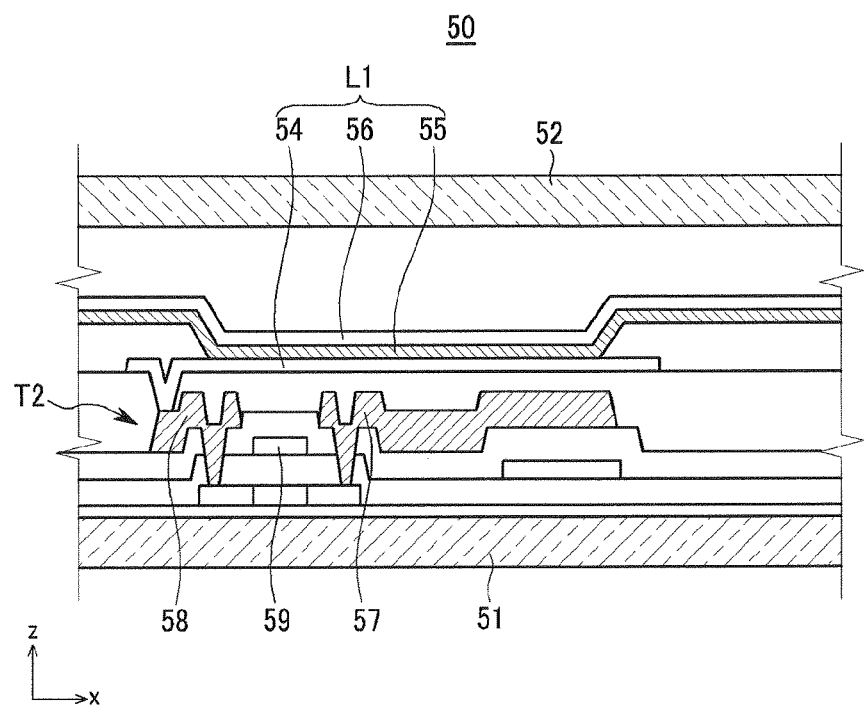
FIG. 4 is a partially enlarged cross-sectional view of the flat display panel in FIG. 1.

With reference to FIGS. 3 and 4, each subpixel of the OLED display includes the organic light emitting element L1 and a driving circuit unit. The organic light emitting element L1 includes an anode electrode 54, an organic light emission layer 55, and a cathode electrode 56.

The driving circuit unit includes at least two thin film transistors (TFTs) and at least one storage capacitor C1. The TFTs basically include a switching transistor T1 and a driving transistor T2. The switching transistor T1 is connected to a scan line SL1 and a data line DL1, and transmits a data voltage inputted from the data line DL1 to the driving transistor T2 according to a switching voltage inputted to the scan line SL1.

The storage capacitor C1 is connected to the switching transistor T1 and a power line VDD, and stores a voltage corresponding to the difference between the voltage transmitted from the switching transistor T1 and the voltage supplied from the power line VDD.

The driving transistor T2 is connected to the power line VDD and the storage capacitor C1, and supplies an output current $I_{OLED}$, which is proportional to the square of the difference between the voltage stored in the storage capacitor C1 and a threshold voltage, to the organic light emitting element L1. The organic light emitting element L1 emits light according to the output current $I_{OLED}$.

The driving transistor T2 includes a source electrode 57, a drain electrode 58, and a gate electrode 59. The anode electrode 54 of the organic light emitting element L1 may be connected to the drain electrode 58 of the driving transistor T2. The configuration of the subpixels may be modified variably without being limited to the above-described example.

The front substrate 52 and the rear substrate 51 are assembled and sealed by a sealant while maintaining a certain gap therebetween to protect the driving circuit units and the organic light emitting elements formed on the rear substrate 51.

With reference to FIGS. 1 and 2, the flat display panel cutting apparatus 1 is a device for breaking the scrap portion 60 formed at an outer edge of the flat display panel 50. A scribing line SCL has been formed on the front substrate 52 in a previous process. The scrap portion is a portion that is to be separated from the flat display panel, and rest of the portion can be referred to be a non-scrap portion of the flat display panel. Therefore, the scrap line SCL is formed between the scrap portion and the non-scrap portion.

In general, when the scrap portion 60 is broken from the front substrate 52 of the flat display panel 50, a glass chip is generated in the vicinity of the scribing line SCL, and bounces up on the front substrate 52 or the light emitting surface. The flat display panel cutting apparatus 1 according to the exemplary embodiment of the present invention blocks a glass chip from bouncing when the scrap portion 60 of the front substrate 52 of the flat display panel 50 is broken, to thereby prevent the front substrate 52 from being damaged due to a pit or a scratch.

That is, in the flat display panel cutting apparatus 1 of the present invention, the chip blocking unit 20 is installed at a location that corresponds to the non-scrap portion of the flat display panel 50 but closer to the scribing line SCL of the flat display panel 50. The scrap breaker 30 is located at an opposite side with respect to the scribing line SCL. The scrap breaker 30 is disposed at a location that corresponds to the scrap portion 60 of the flat display panel 50.

When installing the flat display panel 50 on the stage 10, a non-light emitting surface comes in contact with the stage 10 and a light emitting surface is exposed. For example, the rear substrate 51 of the OLED display supported by the stage 10 can include a non-light emitting surface, and the front substrate 51, which is exposed, can include a light emitting surface.

The chip blocking unit 20 is installed over an upper surface of the stage 10, and is disposed to correspond to one side of the scribing line SCL formed on the light emitting surface of the flat display panel 50 to block a chip generated when the scrap portion 60 is separated from the flat display panel 50.

The scrap breaker 30 grips the scrap portion 60 formed at another side of the scribing line SCL to separate the scrap portion 60 from the flat display panel 50.

The chip blocking unit 20 and the scrap breaker 30 ascend from or descend to the light emitting surface of the flat display panel 50, and independently operate (not shown) or integrally operate by using a stroke difference. The present exemplary embodiment shows the configuration in which the chip blocking unit 20 and the scrap breaker 30 operate integrally.

For example, the flat display panel cutting apparatus 1 further includes a connection member 41 and a driving member 42. The connection member 41 connects the chip blocking unit 20 to the scrap breaker 30 to allow the chip blocking unit 20 and the scrap breaker 30 to operate integrally.

The driving member 42 is connected with the connection member 41, and lifts or lowers the scrap breaker 30 and the chip blocking unit 20 installed at the connection member 41 in a vertical (up/down) direction according to its extending and retracting operation.

According to the extending and retracting operation performed by the driving 42, the chip blocking unit 20 and the scrap breaker 30 ascends from or descends to the light emitting surface and the scrap 60 portion, respectively. While the scrap breaker 30 is separating the scrap portion 60 from the light emitting surface, the chip blocking unit 20 blocks bouncing glass chips along the scribing line SCL. Accordingly, the chip blocking unit 20 prevents a glass chip generated, when the scrap 60 is separated from the flat display panel 50, from bouncing up on the light emitting surface.

The chip blocking unit 20 performs ascending and descending operations by a first stroke distance ST1 with respect to the connection member 41. The scrap breaker 30 performs ascending and descending operations by a second stroke distance ST2 with respect to the connection member. The first stroke distance ST1 of the chip blocking unit 20 is larger than the second stroke distance ST2 of the scrap breaker 30. Accordingly, a glass chip generated, when the scrap portion 60 is separated, can be blocked by the chip blocking unit 20.

In more detail, the chip blocking unit 20 includes a first blocking member 21 and a first rod 22. The first blocking member 21 is disposed to correspond to the non-scrap portion of the flat display panel 50 but closer to the scribing line SCL on the front substrate 52, and has a height that is sufficient to block a glass chip. The first blocking member 21 is formed with a length corresponding to the overall length of the scribing line SCL to maximize a range of blocking a glass chip.

One end of the first rod 22 is connected with the first blocking member 21, and the other end of the first rod 22 is slidably connected with the connection member 41. A first elastic member 23 is coupled to the first rod 22 to support a sliding motion of the first rod 22. Accordingly, the first rod 22 performs ascending and descending operations in the vertical direction with respect to the connection member 41, while being supported by the first elastic member 23.

When the first blocking member 21 touches the light emitting surface, the first rod 22 ascends with respect to the connection member 41, while when the first blocking member 21 is released from or moves above the light emitting surface, the first rod 22 descends with respect to the connection member 41.

The chip blocking unit 20 further includes a second blocking member 24. The second blocking member 24 is formed to be protruded upwardly from an upper end of the first blocking member 21, to further block a glass chip that may bounce up above the first blocking member 21. The second blocking member 24 may have the same length as that of the first blocking member 21, and a gap D (shown in FIG. 2) between the top of the second blocking member 24 and the connection member 41 is longer than the first stroke distance ST1 (shown in FIG. 6) so that the second blocking member 22 may not interfere with the connection member 41 when the first rod 22 ascends.

The scrap breaker 30 includes a pad 31, a delivery member 32, and a second rod 33. As for the pad 31, one or more pads may be formed depending on the length of the scrap portion 60 formed along the scribing line SCL. When a plurality of pads is formed, the pads may be disposed at equal intervals at the scrap portion 60 to apply uniform gripping force to the scrap portion 60. The gripping force is referred to force that can hold the scrap portion 60. In the present embodiment, the gripping force is produced by vacuum. Therefore, the delivery member 32 allows the pads 31 to be mounted and supplies uniform vacuum to each of the plurality of pads 31.

One end of the second rod 33 is connected with the delivery member 32, and the other end of the second rod 33 is slidably connected with the connection member 41. a second elastic member 34 is coupled to the second rod to support a sliding motion of the second rod. Accordingly, the second rod 33 performs ascending and descending operations in the vertical direction with respect to the connection member 41, while being supported by the second elastic member 34.

When the pad 31 contacts the scrap portion 60, the second rod 32 ascends with respect to the connection member 41 (shown in FIG. 6), and when the pad 31 is released from or moves above the scrap portion 60 (shown in FIGS. 2 and 5) or when the scrap portion 60 is separated from the front substrate 52 (shown in FIG. 7), the second rod 32 descends with respect to the connection member 41.

Figure 5:
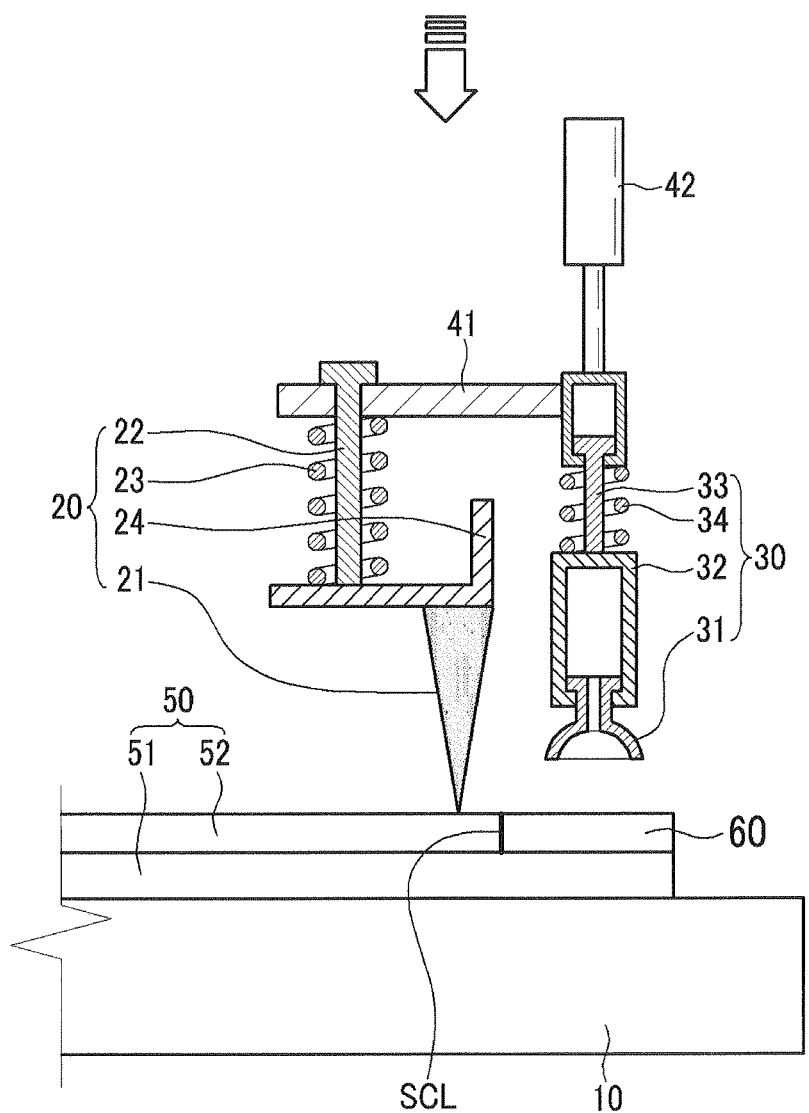
FIG. 5 is a cross-sectional view illustrating a blocking state by a chip blocking member in the flat display panel cutting apparatus in FIG. 1.
Figure 6:
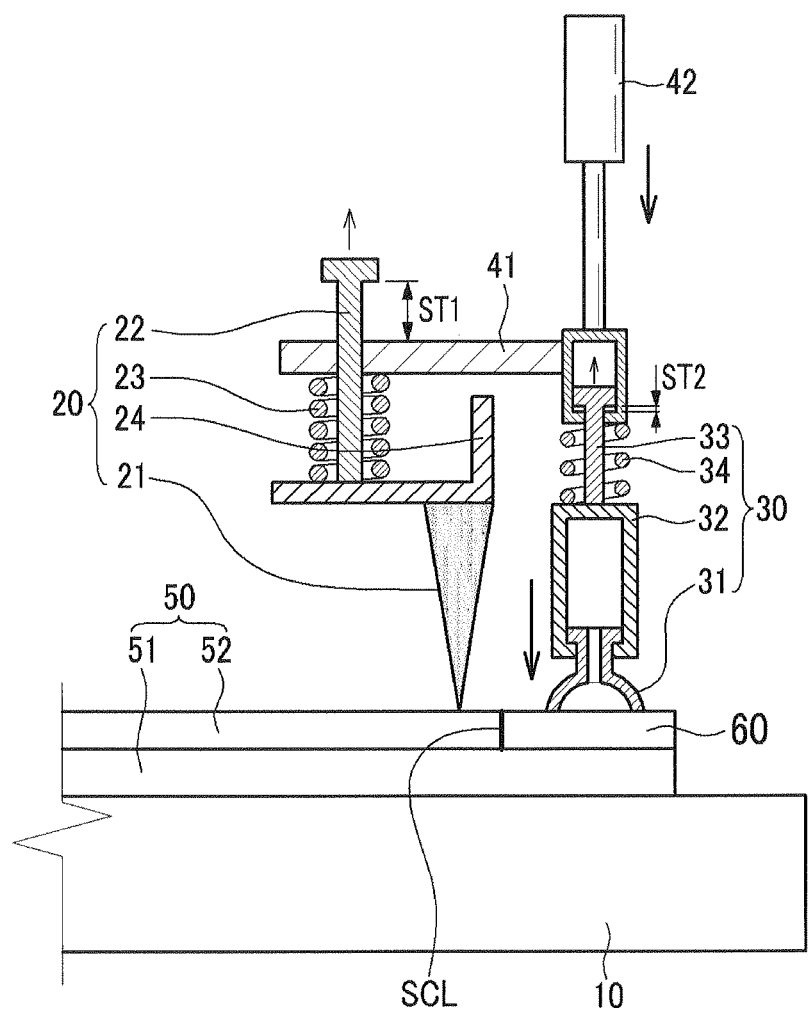
FIG. 6 is a cross-sectional view illustrating a pad is in an adsorbed state in the flat display panel cutting apparatus in FIG. 1.

FIG. 5 is a cross-sectional view illustrating a state of a blocking process by a chip blocking member in the flat display panel cutting apparatus shown in FIG. 1, and FIG. 6 is a cross-sectional view illustrating a pad in a state of gripping process in the flat display panel cutting apparatus in FIG. 1.

With reference to FIGS. 5 and 6, the chip blocking unit 20 and the scrap breaker 30 form a free state (a first state) and a pressed state (a second state) according to the extending and retracting operation of the cylinder 42. The free state refers to a state in which the first blocking member 21 and the pad 31 are not pressed into the flat display panel 50 (shown in FIG. 5). The pressed state refers to a state in which the first blocking member 21 and the pad 31 are pressed to the flat display panel 50 (shown in FIG. 6).

In the free state as shown in FIGS. 5 and 2, the lower edge of the first blocking member 21 is positioned to be lower than the pad 31. Regarding the pressed state as shown in FIG. 6, the first stroke distance ST1 of the first blocking member 21 is larger than the second stroke distance ST2 of the pad 31.

Figure 7:
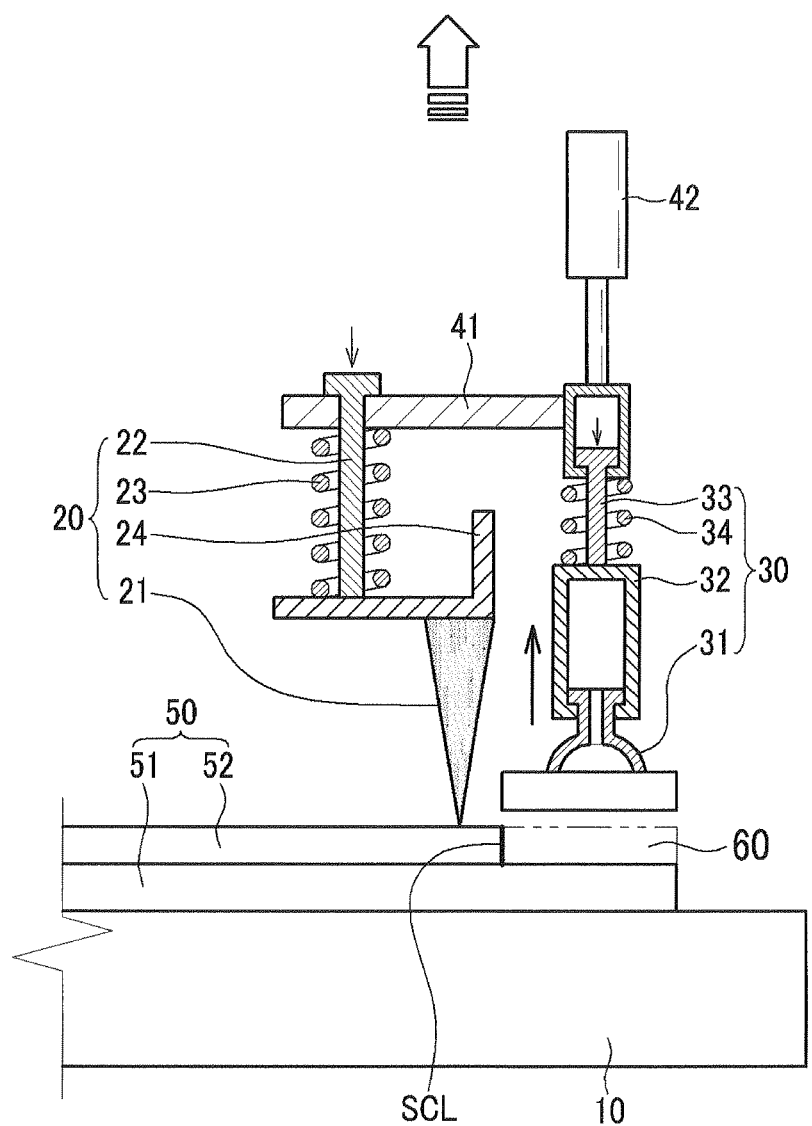
FIG. 7 is a cross-sectional view illustrating a breaking completed state in the flat display panel cutting apparatus in FIG. 1.

FIG. 7 is a cross-sectional view illustrating a state after the breaking process in the flat display panel cutting apparatus in FIG. 1. The process of cutting the scrap portion 60 out of the front substrate 52 of the flat display panel 50 will now be described with reference to FIGS. 5 to 7.

The driving member 42 and the connection member 41 are transferred above the flat display panel 50 placed on the stage 10 by means of a conveying device (not shown).

With reference to FIG. 2, when the driving member 42 and the connection member 41 are completely extended, the first blocking member 21 is disposed above the non-scrap portion near the scribing line SCL on the front substrate 52, and the pad 31 is disposed to correspond to the scrap portion 60.

With reference to FIG. 5, when the driving member 42 extends, the first blocking member 21 and the pad 31 descend, and the first blocking member 21 comes in contact with the front substrate 52 of the flat display panel 50. At this time, the pad 31 is maintained to be separated from the front substrate 52. The first and second blocking members 21 and 24 are first put to a state for blocking a glass chip before the scrap portion 60 is separated by the pad 31.

With reference to FIG. 6, when the driving member 42 extends further, the pad 31 descends further to press the front substrate 52 of the flat display panel 50 together with the first blocking member 21. In this case, the pad 31 grips the front substrate 52 by force produced by vacuum. According to the extending degree of the driving member 42, the first rod 22 connected with the first blocking member 21 ascends by the first stroke distance ST1 from the connection member 41, and the second rod 33 connected with the pad 31 ascends by the second stroke distance ST2 from the connection member 41. The first stroke distance ST1 is larger than the second stroke distance ST2. Thus, the first blocking member 21 can more tightly contact the front substrate 52, firmly maintaining a glass chip blocking state.

With reference to FIG. 7, when the cylinder 42 retracts, the pad 31 connected with the connection member 41 first ascends, and the first blocking member 21 is maintained to be in contact with the front substrate 52 of the flat display panel 50. The first rod 22 connected with the first blocking member 21 is lowered by the first stroke ST1 distance, during which the second rod 33 connected with the pad 31 is lowered by the second stroke distance ST2 that is shorter than the first stroke distance ST1. Although the pad 31 is lowered from the connection member 41, it is rather lifted overall due to the larger ascending operation performed by the driving member 42, to thus completely separate the scrap 60 from the front substrate 52. While the scrap 60 is being separated, a glass chip is continuously blocked by the first and second blocking members 21 and 24.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for cutting a flat display panel, comprising:
 a stage having a continuous seamless surface along the entire length of the stage, the flat display panel being disposed on the stage, the continuous seamless surface of the stage completely covering the flat display panel, the flat display panel having a scrap portion, a non-scrap portion, and a scribing line formed between the scrap portion and the non-scrap portion;
 a scrap breaker capable of gripping and lifting the scrap portion of the flat display panel that is to be separated from the flat display panel;
 a chip blocking unit disposed over the non-scrap portion of the flat display panel, the chip blocking unit contacting the non-scrap portion of the flat display panel while the scrap portion is being separated from the flat display panel; and
 a connection member to connect the chip blocking unit to the scrap breaker, each of the scrap breaker and the chip blocking unit being capable of performing a descending operation to contact the flat display panel, the chip blocking unit moving by a first stroke distance with respect to the connection member while descending to contact the flat display panel, the scrap breaker moving by a second stroke distance with respect to the connection member while descending to contact the flat display panel, the first stroke distance is larger than the second stroke distance.

2. The apparatus of claim 1, further comprising:
 a driving member for lifting or lowering the connection member.

3. The apparatus of claim 2, wherein the chip blocking unit comprises:
 a first rod slidably coupled to the connection member;
 a first blocking member connected to the first rod and disposed to touch the non-scrap portion of the flat display panel while the scrap portion is being separated; and
 a first elastic member coupled to the first rod to support a sliding motion of the first rod.

4. The apparatus of claim 3, wherein the chip blocking unit further comprises a second blocking member formed at an upper end of the first blocking member and extending in an upward direction.

5. The apparatus of claim 3, wherein the scrap breaker comprises:
 a second rod slidably coupled to the connection member;
 a delivery member connected to the second rod;
 a pad coupled to the delivery member, the pad gripping the scrap portion while the scrap portion is being separated, a gripping force being supplied to the pad from the delivery member; and
 a second elastic member coupled to the second rod to support a sliding motion of the second rod.

6. The apparatus of claim 5, wherein the chip blocking unit and the scrap breaker are in one of states that include:
 a first state in which the first blocking member and the pad do not contact the flat display panel and a lower edge of the first blocking member is positioned lower than the pad; and
 a second state in which the first blocking member and the pad contact the flat display panel.

7. The apparatus of claim 1, wherein the flat display panel is an organic light emitting diode (OLED) display.

8. The apparatus of claim 1, wherein the scribing line is formed on a front substrate of the flat display panel.

9. The apparatus of claim 8, wherein the front substrate including a light emitting surface.

10. The apparatus of claim 1, wherein the scrap breaker is disposed over the flat display panel.

11. An apparatus for cutting an organic light emitting diode display comprising:

a stage having a continuous seamless surface along the entire length of the stage, the organic light emitting diode display being disposed on the stage, the continuous seamless surface of the stage completely covering the organic light emitting diode display, the organic light emitting diode display having a scrap portion, a non-scrap portion, and a scribing line formed between the scrap portion and the non-scrap portion;

a scrap breaker capable of gripping and lifting the scrap portion of the organic light emitting diode display that is to be separated from the organic light emitting diode display;

a chip blocking unit disposed over the non-scrap portion of the organic light emitting diode display, the chip blocking unit contacting the non-scrap portion of the organic light emitting diode display while the scrap portion is being separated from the organic light emitting diode display; and a connection member to connect the chip blocking unit to the scrap breaker, each of the scrap breaker and the chip blocking unit being capable of performing a descending operation to contact the organic light emitting diode display, the chip blocking unit moving by a first stroke distance with respect to the connection member while descending to contact the organic light emitting diode display, the scrap breaker moving by a second stroke distance with respect to the connection member while descending to contact the organic light emitting diode display, the first stroke distance is larger than the second stroke distance.

12. The apparatus of claim 11, further comprising:
a driving member for lifting and lowering the connection member.

13. The apparatus of claim 12, wherein the chip blocking unit comprises:
a first rod slidably coupled to the connection member;
a first blocking member connected to the first rod and disposed to touch the non-scrap portion of the flat display panel while the scrap portion is being separated; and
a first elastic member coupled to the first rod to support a sliding motion of the first rod.

14. The apparatus of claim 13, wherein the scrap breaker comprises:
a second rod slidably coupled to the connection member;
a delivery member connected to the second rod;
a pad coupled to the delivery member, the pad gripping the scrap portion while the scrap portion is being separated, a gripping force being supplied to the pad from the delivery member; and
a second elastic member coupled to the second rod to support a sliding motion of the second rod.

\* \* \* \* \*